United States Patent
Tang

(10) Patent No.: US 9,641,913 B2
(45) Date of Patent: May 2, 2017

(54) SMART TERMINAL INFORMATION DISPLAY METHOD AND SMART TERMINAL

(71) Applicant: JRD COMMUNICATION INC., Shenzhen (CN)

(72) Inventor: Xiangdong Tang, Shenzhen (CN)

(73) Assignee: JRD COMMUNICATION INC., Shenzhen (CN)

( * ) Notice: Subject to any disclaimer, the term of this patent is extended or adjusted under 35 U.S.C. 154(b) by 0 days.

(21) Appl. No.: 14/974,453

(22) PCT Filed: Apr. 1, 2015

(86) PCT No.: PCT/CN2015/075655
§ 371 (c)(1),
(2) Date: Dec. 18, 2015

(87) PCT Pub. No.: WO2016/086558
PCT Pub. Date: Jun. 9, 2016

(65) Prior Publication Data
US 2016/0301990 A1    Oct. 13, 2016

(30) Foreign Application Priority Data
Dec. 4, 2014    (CN) .......................... 2014 1 0742777

(51) Int. Cl.
*H04M 1/66*    (2006.01)
*H04Q 3/545*    (2006.01)
*G06F 9/44*    (2006.01)
*H04M 3/16*    (2006.01)
*H04W 28/02*    (2009.01)
*H04W 88/02*    (2009.01)

(52) U.S. Cl.
CPC .......... *H04Q 3/54525* (2013.01); *G06F 8/38* (2013.01); *G06F 9/44* (2013.01); *G06F 9/4443* (2013.01); *H04M 3/16* (2013.01); *H04W 28/0278* (2013.01); *H04W 88/02* (2013.01)

(58) Field of Classification Search
CPC ......... H04Q 3/54525; G06F 9/44; G06F 8/38; G06F 9/4443; H04M 3/16; H04W 28/0278; H04W 88/02
USPC ...................... 455/411, 566, 550.1
See application file for complete search history.

(56) References Cited

U.S. PATENT DOCUMENTS

| | | | |
|---|---|---|---|
| 2010/0162182 A1* | 6/2010 | Oh ...................... | G06F 3/04883 715/863 |
| 2012/0046079 A1* | 2/2012 | Kim .................. | H04M 1/72577 455/566 |
| 2012/0084734 A1* | 4/2012 | Wilairat .................. | G06F 21/36 715/863 |

(Continued)

*Primary Examiner* — Khai M Nguyen
(74) *Attorney, Agent, or Firm* — Shimokaji IP

(57) ABSTRACT

A smart terminal information display method and a smart terminal, the smart terminal information display method may include a smart terminal detecting an inputted locking event to lock its screen, responding to the locking event and displaying the information containing a list of specific functions on the screen, and entering the locking screen interface. Embodiments enable a user to easily acquire new function information of the smart terminal and improves the user experience, but also makes a full use of the locking screen background of the smart terminal and expands the functions of the smart terminal, thereby further improving the user experience.

16 Claims, 3 Drawing Sheets

(56) References Cited

U.S. PATENT DOCUMENTS

| | | | |
|---|---|---|---|
| 2013/0283199 A1* | 10/2013 | Selig | G06F 3/0484 |
| | | | 715/781 |
| 2014/0380464 A1* | 12/2014 | Lee | G06F 3/017 |
| | | | 726/19 |
| 2015/0033361 A1* | 1/2015 | Choi | G06F 21/60 |
| | | | 726/27 |
| 2015/0254069 A1* | 9/2015 | Ito | G06F 13/00 |
| | | | 717/174 |
| 2015/0334570 A1* | 11/2015 | Nade | H04M 1/67 |
| | | | 455/411 |
| 2016/0077606 A1* | 3/2016 | Hyun | G06F 3/14 |
| | | | 345/156 |

* cited by examiner

SMART TERMINAL INFORMATION DISPLAY METHOD AND SMART TERMINAL

TECHNICAL FIELD

The present disclosure relates to the field of mobile communications technologies, and in particular relates to a smart terminal information display method and a smart terminal.

BACKGROUND

Mobile terminals are small in size and easy to carry, and have become an indispensable item of daily use for more and more users. According to the statistics, mobile terminal users have exceeded 700 million in China. Along with the rapid growth of the mobile Internet over recent years, smart terminals have advantages such as acquiring information at any time via connection to the Internet. In addition cell phones have gradually become a necessity in people's daily lives. As wireless communication technologies have been developed, cell phone data services have increased enriching people's life.

As people become more and more dependent on smart terminals, increasingly plentiful functions have become the focus of competition among all major vendors. Additionally types of smart terminals are continuously updated. However, users typically are not aware of the new functions developed by vendors. For example, users may not be aware of functions such as a standby function or wakeup function activated by double tapping on the touch screen or a machine wakeup function by using a machine voice to wakeup. The lack of awareness of these functions results in a loss of experience for the users.

SUMMARY

At least one embodiment provides a smart terminal information display method and a smart terminal, facilitating the awareness of functions and the methods of their use by users.

One technical solution according to at least one exemplary embodiment provides a smart terminal information display method comprising: detecting an inputted locking event to lock the smart terminal's screen; responding to the locking event and displaying the information on the screen, where the information includes a list of specific functions; receiving, selecting a specific function from the list (selection command) and executing the selection command; displaying on the screen a brief introduction and the method of using (use method) of the selected specific function; determining whether to read the information containing the specific function and the use method associated with the specific function; if yes, entering the interface associated with locking the screen (the locking screen interface) when a user has completed reading the displayed specific function and the use method associated with the specific function; otherwise, turning off the interface displaying the information and entering the locking screen.

Optionally, the step of entering the locking screen interface, when the reading of the screen displayed specific function and the use method associated with the specific function is completed, includes the smart terminal detecting the locking event to lock its screen confirming that the reading of the specific function and the use method associated with the specific function has been completed; and entering the locking screen interface.

Optionally, the locking event comprises triggering the power button of the smart terminal. Another technical solution according to at least one exemplary embodiment includes a smart terminal information display method comprising: the smart terminal detecting an inputted locking event to lock its screen; responding to the locking event and displaying the information containing the specific function and the use method associated with the specific function on the screen; and entering the locking screen interface.

Optionally, prior to the step of entering the locking screen interface, the method further comprises: determining whether to read the information which contains the specific function and the use method associated with the specific function; if yes, executing the step of entering the locking screen interface when completing reading of the displayed specific function and the use method associated with the specific function; otherwise, executing the step of entering the locking screen interface after turning off the interface displaying the information.

Optionally, executing the step of entering the locking screen interface, when completing the reading of the displayed specific function and the use method associated with the specific function, includes the smart terminal detecting the locking event to lock its screen when the reading is completed; and entering the locking screen interface.

Optionally, the step of responding to the locking event and displaying the information containing the specific function and the use method associated with the specific function on the screen comprises: displaying, on the screen, the information containing a list of specific functions; receiving and executing a selection command on the list; displaying a brief introduction and method of use (use method) of the specific function selected by the selection command. At least one embodiment includes a locking event including triggering the power button of the smart terminal.

Yet another technical solution according to at least one exemplary embodiment includes a smart terminal comprising a detection module and a display module, the display module is configured to respond to the locking event and display, on the screen, the information containing the specific function and the use method associated with the specific function; the display module is further configured to display the locking screen interface.

Optionally, the display module is further configured to, prior to entering the locking screen interface, determine whether to read the specific function and the use method associated with the specific function; if yes, entering the locking screen interface when completing reading the displayed specific function and the use method associated with the specific function; otherwise, it displays the locking screen interface after turning off the interface displaying the information.

Optionally, the display module is further configured to, when the detection module detects the locking event to lock its screen and confirms completion of reading the screen displayed specific function and the use method associated with the specific function, display the locking screen interface.

Optionally the display module is further configured to display the information containing a list of specific functions on the screen, and after the detection module receives and executes a selection command selecting a specific function on the list, display a brief introduction and use method associated with the selected specific function.

Optionally the locking event comprises triggering the power button of the smart terminal. Unlike the related art, embodiments of the smart terminal of the present invention detects an inputted locking event to lock its screen, responds to the locking event and displays the information containing the specific function and the use method associated with the specific function on the screen, and enters the locking screen interface when the information display is completed, which not only enables a user to easily acquire new function information of the smart terminal and improves the user experience, but also makes a full use of the locking screen background of the smart terminal and expands the functions of the smart terminal, thereby further improving the user experience.

DETAILED DESCRIPTION

Figure 1:
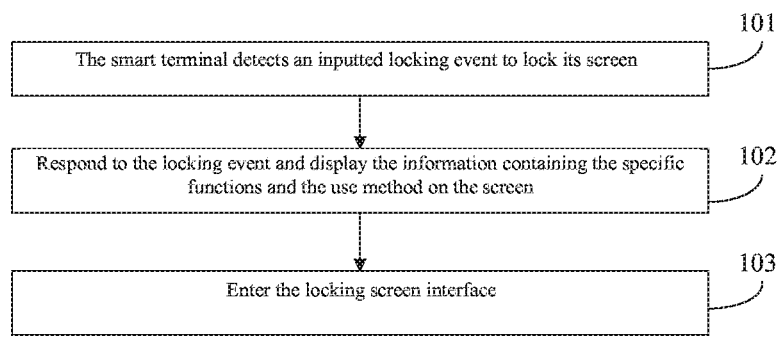
FIG. 1 depicts a flow chart of an embodiment of the smart terminal information display method according to at least one exemplary embodiment.
Figure 2:
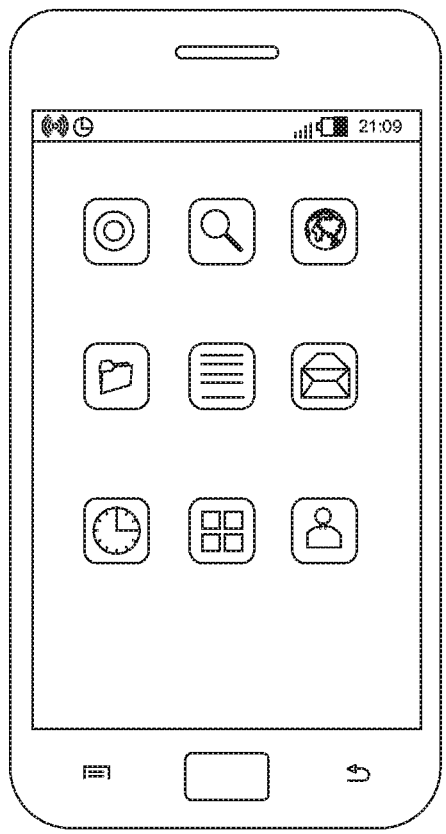
FIG. 2 illustrates an embodiment prior to the smart terminal detecting a locking screen event in the smart terminal information display method in FIG. 1.

FIG. 1 depicts a flow chart of an embodiment of the smart terminal information display method according to at least one exemplary embodiment, and the smart terminal information display method of at least one exemplary embodiment comprises: step 101: the smart terminal detecting an inputted locking event to lock its screen;

When a smart terminal runs in a normal state, the smart terminal is capable of responding to various operations of a user of the communication terminal, as illustrated in FIG. 2, where the above normal state refers to a state prior to the screen locking and in which the smart terminal has been turned on.

To enrich the display interface of the smart terminal and also to enable the presentation of a specific function of the smart terminal to the user without affecting the normal use of the smart terminal by the user, the present exemplary embodiment can use a locking screen event as the triggering event to display the specific function.

Optionally, the specific function can be an application run by the smart terminal or a function associated with the operating system, and can be a unique function specific to smart terminals of the models of the same brand but older than the model of the smart terminal in the present exemplary embodiment, and can include equivalently new functions compared with currently available smart terminals of other brands, for examples specific functions such as a start-up with fingerprints function, standby or wakeup by double tapping on the touch screen function or machine wakeup by voice function, the examples of which should not be considered limited herein.

In at least one embodiment the smart terminal detects an locking event input to lock its screen. Optionally, the above locking event comprises triggering the power button of the smart terminal, and in other exemplary embodiments, the smart terminal can also use other screen locking methods as the triggering event, for example, locking the screen through a set button combination or function keys, which are not limited herein. For example step 102 includes responding to the locking event and displaying the information containing the specific function and the use method associated with the specific function on the screen.

Optionally, upon receiving the locking event to lock its screen, the smart terminal does not enter the screen locking state immediately; instead, it responds to the above locking event and displays the information containing the specific function and the use method associated with the specific function on the screen.

Figure 3:
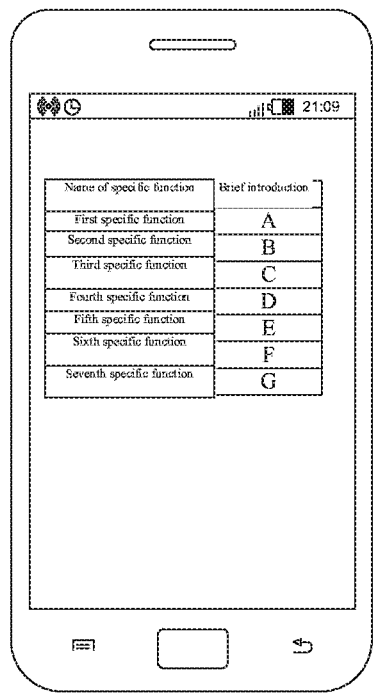
FIG. 3 illustrates an embodiment after the smart terminal detects a locking screen event in the smart terminal information display method in FIG. 1.

In at least one embodiment as illustrated in FIG. 3, the smart terminal displays the information containing a list of specific functions on the screen. Optionally, the list comprises names and brief introductions of the specific functions, and each specific function may be selected through being clicked or in other ways. For example, when the second specific function in FIG. 3 is selected, the smart terminal displays the brief introduction and use method associated with the second specific function selected by the selection command. For example step 103 includes entering the locking screen interface.

After the smart terminal displays the information containing the specific function and the use method associated with the specific function on the screen, it can detect the locking event to lock its screen to confirm that the step of displaying the specific function and the use method associated with the specific function on the screen has been completed, and then the smart terminal does not display the above information containing the specific function and the use method associated with the specific function any more, but enters the locking screen interface directly.

Unlike the related art, the smart terminal in at least one embodiment detects an inputted locking event to lock its screen, responds to the locking event and displays the information containing the specific function and the use method associated with the specific function on the screen, and enters the locking screen interface when the information display is completed, which not only enables a user to easily acquire the information of specific functions of the smart terminal and improves the user experience, but also makes a full use of the locking screen background of the smart terminal and expands the functions of the smart terminal, thereby further improving the user experience.

In another embodiment, the smart terminal may also detect an inputted unlocking event during unlocking, and then does not directly enter the menu desktop after the corresponding unlocking event; instead, it displays the information containing the specific function and the use method associated with the specific function on the screen. When the step of displaying the information containing the specific function and the use method associated with the specific function on the screen by the smart terminal is completed, the smart terminal no longer displays the above information containing the specific function and the use method associated with the specific function, but directly enters the menu interface and enters the work mode.

Figure 4:
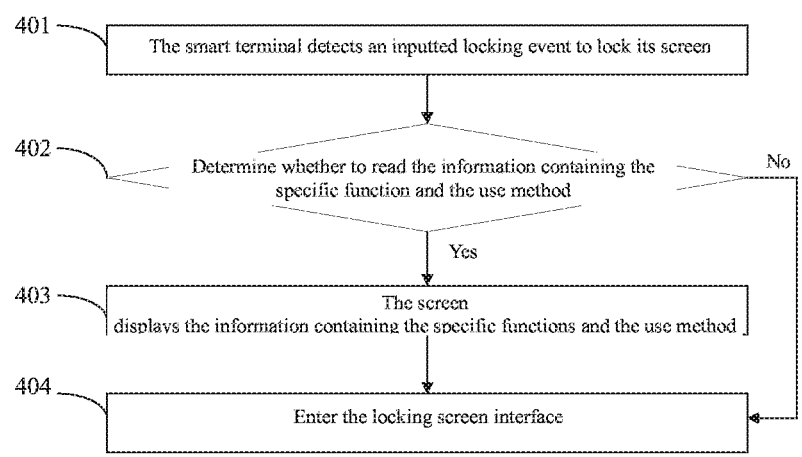
FIG. 4 depicts a flow chart of another embodiment of the smart terminal information display method according to at least one exemplary embodiment.

FIG. 4 depicts a flow chart of another embodiment of the smart terminal information display method according to at least one exemplary embodiment. The smart terminal information display method according to the exemplary embodiment comprises step 401 which can include the smart terminal detecting an inputted locking event to lock its screen.

To enrich the display interface of the smart terminal, and to also enable the presentation of a specific function of the smart terminal to the user without affecting the normal use of the smart terminal by the user, the exemplary embodiment can use a locking screen event as the triggering event to display the specific function.

In at least one embodiment, the smart terminal detects an inputted locking event to lock its screen. Optionally, the above locking event comprises triggering the power button of the smart terminal, and in other exemplary embodiments, the smart terminal may also use other screen locking ways as the triggering event, for example, through a set button combination.

Optionally, the specific function can be an application run by the smart terminal or a function coming with or associated with the operating system, and can be a unique function relative to smart terminals of older models. It can also include equivalently new functions compared with currently available smart terminals of other brands, such as for example a start-up with fingerprints function, a standby or wakeup by double tapping on the touch screen function or machine wakeup by voice function, examples of which are not limited herein. For example, step 402 includes determining whether to read the information containing the specific function and the use method associated with the specific function.

Figure 5:
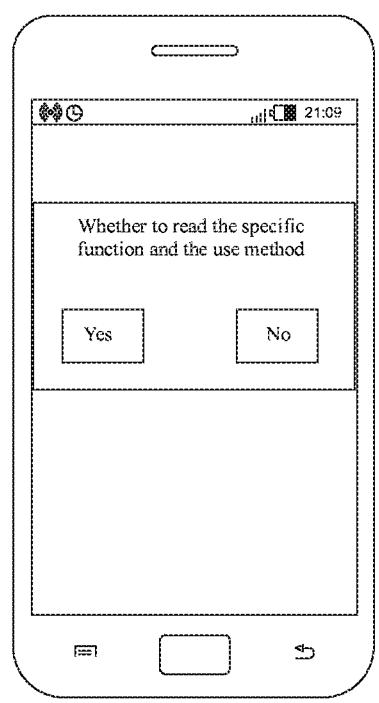
FIG. 5 illustrates an embodiment after the smart terminal detects a locking screen event in the smart terminal information display method in FIGS. 4.

After the smart terminal detects an inputted locking event to lock its screen, a check box can pop up on its screen, where checking or unchecking the box comprises selecting reading the information containing the specific function and the use method associated with the specific function thereof, as illustrated in FIG. 5. Further, when the "yes" button is selected as illustrated in FIG. 5, Step 403 can be performed. If the "no" button is selected, then Step 404 can be performed. For example 403 can include the smart terminal displaying the information containing the specific function and the use method associated with the specific function on the screen.

In at least one embodiment, the smart terminal displays the information containing a list of specific functions on the screen. Optionally, the list comprises names and brief introductions of the specific functions, and each specific function may be selected for example by clicking a user interface. When one of the specific functions is selected, the smart terminal receives and executes the above selection command on the list, and displays the brief introduction and use method associated with the specific function selected by the selection command.

The user reads the specific function and the use method associated with the specific function displayed on the screen by the smart terminal. In at least one embodiment, when the smart terminal detects the locking event to lock its screen that is inputted again so as to confirm that the reading the specific function and the use method associated with the specific function displayed on the screen is completed, Step 404 is performed. For example, step 404 can include entering the locking screen interface.

To save limited electric resources and memory resources of the smart terminal, when the smart terminal detects the inputted locking event to lock its screen, the display time of the information containing the specific function and the use method associated with the specific function is not indefinite; instead, the display time is set, and when the smart terminal does not receive any command after a set time threshold has passed, it directly goes to Step 404 and no longer displays the information containing the specific function and the use method associated with the specific function, but directly enters the locking screen interface, so as to save the power for the smart terminal.

In another embodiment, when the user completes reading the screen displayed specific function and the use method associated with the specific function, it may return to the interface of the information containing the list of specific functions where the user can continue to read other specific functions and use methods associated with the specific functions, examples of which are not limited herein.

Unlike the related art, the smart terminal in the at least one exemplary embodiment detects an inputted locking event to lock its screen, displays the specific function and the use method associated with the specific function of the smart terminal on the screen, and enters the locking screen interface when it is confirmed that the reading is completed, otherwise directly enters the locking screen interface. The above method not only enables a user to easily acquire the information of specific functions of the smart terminal and improves the user experience, but also makes a full use of the locking screen background of the smart terminal and expands the functions of the smart terminal, thereby further improving the user experience.

Optionally, in another embodiment, after the smart terminal detects an inputted locking event to lock its screen, a box whether to read the information containing the specific function and the use method associated with the specific function pops up for the user to select, which not only is more user friendly, but also can save the memory resources and electric resources of the smart terminal. When the user does not select the above box within a preset time threshold, the smart terminal can directly enter the locking screen interface, which further saves the memory resources and electric resources of the smart terminal, extends the life of the smart terminal, and makes it convenient for the user.

Figure 6:
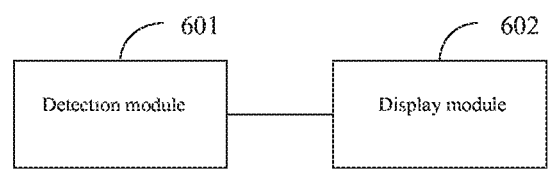
FIG. 6 illustrates the structure of an embodiment of the smart terminal according to at least one exemplary embodiment.

FIG. 6 illustrates the structure of an embodiment of the smart terminal according to at least one exemplary embodiment. The smart terminal according to at least one exemplary embodiment comprises a detection module 601 and a display module 602. The detection module 601 is configured for the smart terminal to detect the inputted locking event to lock its screen.

To enrich the display interface of the smart terminal, and also to enable the presentation of a specific function of the smart terminal to the user without affecting the normal use of the smart terminal by the user, the present exemplary embodiment can use a locking screen event as the triggering event to display the specific function. In at least one embodiment, the detection module 601 detects an inputted locking event to lock its screen. Optionally, the above locking event comprises triggering the power button of the smart terminal, and in other exemplary embodiments, the smart terminal may also use other screen locking ways as the triggering event, for example, through a set button combination.

Optionally, the specific function can be an application run by the smart terminal or a function coming or associated with the operating system, and can be a unique function relative to smart terminals of older models, and also can include equivalently new functions compared with currently available smart terminals of other brands, examples of such functions include start-up with fingerprints function, standby or wakeup by double tapping on the touch screen functions or machine wakeup by voice function, examples of which are not limited herein. The display module 602 is configured to display the information containing the specific function and the use method associated with the specific function on the screen of the smart terminal.

When the detection module 601 receives the locking event to lock its screen, the display module 602 may not display the screen locking interface immediately; instead, it can respond to the above locking event and display the information containing the specific function and the use method associated with the specific function on the screen.

In at least one embodiment, the smart terminal displays the information containing a list of specific functions on the screen. Optionally, the list comprises names and brief introductions of the specific functions, and each specific function can be selected for example by positioning a cursor and a user clicking. When one of the specific functions is selected, the smart terminal can receive and executes the above selection command on the list, and displays the brief introduction and use method of the specific function selected by the selection command. The display module 602 is further configured to display the screen locking interface.

When the display module 602 displays the information containing the specific function and the use method associated with the specific function on the screen, the detection module 602 continues to detect if there is a locking event inputted again, and when detecting a locking event inputted again to lock its screen, it can determine that the function of displaying the specific function and the use method associated with the specific function on the screen has been completed, then the display module 602 no longer displays the information containing the specific function and the use method associated with the specific function, but directly displays the screen locking interface.

Unlike the related art, after the detection module in the at least one exemplary embodiment detects an inputted locking event to lock its screen, the display module responds to the locking event and displays the information containing the specific function and the use method associated with the specific function on the screen, and displays the locking screen interface when the information display is completed, which not only enables a user to easily acquire the information of specific functions of the smart terminal and improves the user experience, but also makes a full use of the locking screen background of the smart terminal and expands the functions of the smart terminal, thereby further improving the user experience.

In another embodiment, the detection module may also detect an inputted unlocking event during unlocking where the display module does not directly enter the menu desktop after the corresponding unlocking event; instead, it displays the information containing the specific function and the use method associated with the specific function on the screen. When the display of the information containing the specific function and the use method associated with the specific function on the screen by the display module is completed, it no longer displays the above information containing the specific function and the use method associated with the specific function, but directly displays the menu interface and the smart terminal enters the normal work mode.

In another embodiment, after the detection module detects an inputted locking event to lock the smart terminal, the display module pops up a check box on the screen of the smart terminal, where the box comprises whether to select reading the information containing the specific function and the use method associated with the specific function thereof. The user can select whether to read the specific function and the use method associated with the specific function of the smart terminal. If the command received by the smart terminal is Yes, then the display module displays the information containing the specific function and the use method associated with the specific function on the screen of the smart terminal.

In at least one embodiment, the display module displays the information containing a list of specific functions on the screen of the smart terminal. Optionally, the list comprises names and brief introductions of the specific functions, and each specific function may be selected clicking a user interface. When one of the specific functions is selected, the detection module can receive and execute the above selection command selecting a specific function on the list, and the display module displays the brief introduction and use method of the specific function selected by the selection command.

After the detection module detects the locking event inputted again to lock its screen, the display module confirms that the user has completed reading the screen displayed specific function and the use method associated with the specific function, and displays the locking screen interface. If the command received by the smart terminal is No, then the display module directly displays the locking screen interface.

To save limited electric resources and memory resources of the smart terminal, in at least one embodiment when the detection module detects the inputted locking event to lock its screen, the display module does not display the information containing the specific function and the use method associated with the specific function indefinitely in terms of time, but sets a display time, and when the smart terminal does not receive any command after a set time threshold has passed, the display module displays the locking screen interface, so as to save the power for the smart terminal.

In another embodiment, when the user completes reading the specific function and the use method associated with the specific function displayed on the current screen, the display module may return to the interface of the information containing the list of specific functions where the user can continue to read other specific functions and use methods, which is not limited herein.

Unlike the related art, after the detection module of the smart terminal in the at least one exemplary embodiment detects an inputted locking event to lock its screen, the display module displays the specific function and the use method associated with the specific function of the smart terminal on the screen, and displays the locking screen interface when it is confirmed that the reading is completed, otherwise directly displays the locking screen interface. The above method not only enables a user to easily acquire the information of specific functions of the smart terminal and improves the user experience, but also makes a full use of the locking screen background of the smart terminal and expands the functions of the smart terminal, thereby further improving the user experience.

In at least one further embodiment, after the detection module of the smart terminal detects an inputted locking event to lock the screen of the smart terminal, the display module pops up a box whether to read the information containing the specific function and the use method associated with the specific function for the user to select, which not only is more user friendly, but also can save the memory resources and electric resources of the smart terminal. When the smart terminal does not process the above box within a preset time threshold, moreover, the display module directly displays the locking screen interface, which further saves the memory resources and electric resources of the smart terminal, extends the life of the smart terminal, and makes it convenient for the user.

Only examples of embodiments of the present invention are described above, which are not intended to limit the scope of the present invention. Any equivalent structure or equivalent procedure variation made according to the Specification and Drawings of the present invention, or direct or indirect applications in other related technical fields, shall similarly be encompassed by the present invention.

The invention claimed is:

1. A smart terminal information display method for a smart terminal, comprising:
    detecting an inputted locking event to lock a screen while in an unlocked state;
    responding to the locking event by displaying on the screen, in an unlocked screen interface, information containing a list of specific functions;
    selecting a specific function on the list;
    receiving and executing the selected specific function on the list;
    displaying a brief introduction and use method of the specific function on the screen;
    determining whether to display information containing the specific function and a use method of the specific function;
    when the determination is yes, displaying the information containing the specific function and the use method of the specific function; and
    entering a locking screen interface on the screen.

2. The method according to claim 1, wherein the determination is based on whether the displaying of the information containing the specific function and the use method of the specific function has occurred.

3. The method according to claim 1, wherein the locking event comprises triggering a power button of the smart terminal.

4. A smart terminal information display method for a smart terminal, the method comprising:
    detecting an inputted locking event to lock a screen while the smart terminal is in an unlocked state;
    responding to the locking event by displaying on the screen, in an unlocked screen interface, information containing a specific function and a use method of the specific function on the screen; and
    entering a locking screen interface.

5. The method according to claim 4, wherein the locking event comprises triggering a power button of the smart terminal.

6. The method according to Claim 4, wherein the displaying of the information containing the specific function and the use method of the specific function is in response to a determination of whether to display the information containing the specific function and the use method of the specific function.

7. The method according to claim 6, wherein the determination is based on whether the displaying of the information containing the specific function and the use method of the specific function has occurred.

8. The method according to claim 4, wherein the displaying of the information further includes displaying a list of specific functions on the screen.

9. The method according to claim 8, further comprising: receiving and executing a selection command on the list.

10. The method according to claim 9, further comprising:
    displaying a brief introduction and the use method of the specific function corresponding to the selection command on the screen.

11. A smart terminal, comprising:
    a screen;
    a detection module; and
    a display module detecting an inputted locking event to lock the screen while the smart terminal is in an unlocked state,
    the display module responding to the locking event by displaying on the screen, in an unlocked screen interface, information containing a specific function and a use method of the specific function on the screen and displaying a locking screen interface.

12. The smart terminal according to claim 11, wherein the displaying of the information containing the specific function and the use method of the specific function is in response to a determination of whether to display the information containing the specific function and the use method of the specific function.

13. The smart terminal according to claim 12, wherein the determination is based on whether the displaying of the information containing the specific function and the use method of the specific function has occurred.

14. The smart terminal according to claim 11, wherein the displaying of the information further includes displaying a list of specific functions on the screen.

15. The smart terminal according to claim 14, where after the detection module receives and executes a selection command selecting the specific function from the list, the display module displays a brief introduction and the use method of the specific function on the screen.

16. The smart terminal according to claim 11, wherein the locking event comprises triggering a power button of the smart terminal.

* * * * *